(12) United States Patent
Gramkow et al.

(10) Patent No.: US 7,634,824 B2
(45) Date of Patent: Dec. 22, 2009

(54) SYSTEM AND USER INTERFACE FOR HANDLING A PERSON, AND METHOD THEREFOR

(75) Inventors: Asger Gramkow, Augustenborg (DK); Thomas Færgemann, Sønderborg (DK); Thomas Morthorst Jensen, Sønderborg (DK)

(73) Assignee: HeCare Systems ApS (DK)

( * ) Notice: Subject to any disclaimer, the term of this patent is extended or adjusted under 35 U.S.C. 154(b) by 33 days.

(21) Appl. No.: 10/544,365

(22) PCT Filed: Feb. 3, 2004

(86) PCT No.: PCT/DK2004/000070

§ 371 (c)(1),
(2), (4) Date: Aug. 3, 2005

(87) PCT Pub. No.: WO2004/069125

PCT Pub. Date: Aug. 19, 2004

(65) Prior Publication Data

US 2006/0137091 A1   Jun. 29, 2006

(30) Foreign Application Priority Data

Feb. 3, 2003   (DK)   ................ 2003 00140

(51) Int. Cl.
*A61G 7/10*   (2006.01)
(52) U.S. Cl. ............... 5/81.1 R; 5/83.1; 5/86.1
(58) Field of Classification Search ........ 5/81.1 R, 5/83.1, 85.1–87.1; 212/901
See application file for complete search history.

(56) References Cited

U.S. PATENT DOCUMENTS

| | | | |
|---|---|---|---|
| 4,375,840 A | | 3/1983 | Campbell |
| 4,704,749 A | * | 11/1987 | Aubert .................... 5/87.1 |
| 5,708,993 A | | 1/1998 | Campbell et al. |
| 5,758,371 A | | 6/1998 | VanDyke et al. |
| 5,892,180 A | * | 4/1999 | Carey .................... 177/144 |
| 6,026,523 A | * | 2/2000 | Simon et al. ............ 5/81.1 R |
| 6,092,247 A | | 7/2000 | Wilson |

FOREIGN PATENT DOCUMENTS

| | | |
|---|---|---|
| EP | 0 241 096 | 10/1987 |
| JP | 2001-327554 | 11/2001 |
| WO | WO 02/074216 | 9/2002 |

* cited by examiner

*Primary Examiner*—Michael Trettel
(74) *Attorney, Agent, or Firm*—Cantor Colburn LLP

(57) ABSTRACT

The invention relates to a handling system for lifting and/or moving a person from a first position to another. The system includes a frame having a base frame and a lifting frame being part of a lifting device for the person. The system also includes at least three wheels positioned in different parts of the base frame and allowing the handling system to be moved over a surface from said first position to another, and at least one user interface allowing the person or another person to control the handling system. Further, the system includes at least one of the wheels being directional controllable from the at least one user interface and each of the wheels being mounted pivotally around a vertical axle of the wheels.

Figure 1:
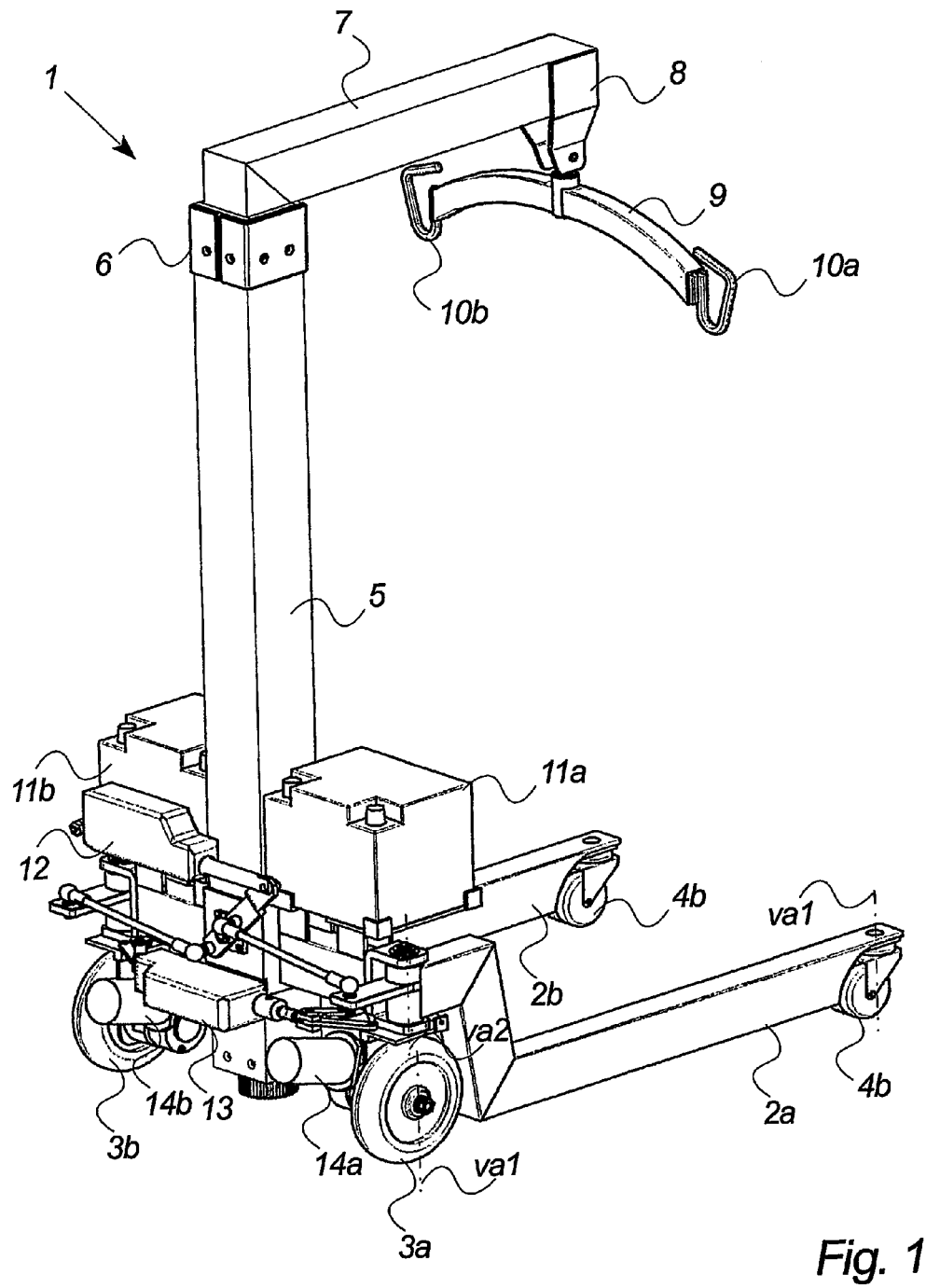

The invention also relates to a user interface and a method of handling a person.

29 Claims, 11 Drawing Sheets

SYSTEM AND USER INTERFACE FOR HANDLING A PERSON, AND METHOD THEREFOR

BACKGROUND OF THE INVENTION

The present invention relates to a handling system for lifting and/or moving a person from a first position to another according to the preamble of claim 1, a user interface for a handling system according to the preamble of claim 15 and a method of handling a person.

The available systems for lifting disabled persons usually incorporate the functionality of moving the lifted person from a position to another.

The most commonly used lift system involves the use of four wheels positioned in opposite corners of a fork-shaped basic frame of the system. Some of the wheels are usually of type that directionally may move freely and thus allowing an assistant to push the lift system in a preferred direction.

The system has the significant disadvantage of requiring an assistant to push the lift system. Further, the system necessitates a lot of space in order to be steered around in narrow spaces e.g. in a person's bed or living room.

To avoid an assistant, or facilitate the job of the assistant, more advanced lift systems have been broad forward such as systems in which electric motors drive an axle of the wheels. The systems are usually equipped with push buttons or joystick allowing the person or the assistant to move the lift forward or backward at different speeds. The lift systems with electric motors still require significant space in order to be steered around. With the electric drive and supporting user interface the space requirement are often higher than with manually driven systems due to limitations and less precision in the user interface. Such a lift system with these disadvantages is e.g. known from U.S. Pat. No. 5,758,371.

The invention provides a handling system for lifting or moving a person from a first position to another, a user interface and a method that avoid the abovementioned disadvantages.

The invention further provides a handling system that allows the handling system to be steered in an easy and natural way e.g. in limited spaces by the lifted person or an assistant.

SUMMARY OF THE INVENTION

The invention relates to a handling system in which each of said wheels are mounted pivotally around a vertical axle for said wheels.

Hereby, it is possible to steer the handling system in an easy and natural way e.g. in limited spaces by the lifted person or an assistant. Further, the present handling system allows the person, being lifted or moved, single-handed to perform the lift or movement only with the help of the user interface. If an assistant controls the handling system the assistant may focus less on the system and more e.g. on the direction of the system and the well being of the person, being lifted or moved.

It should be emphasised that with the phrase "from a first position to another" may be understood as moving the person a distance or rotating the person in the same position allowing a different part of the person to face the position.

The term "user interface" should be understood broadly as the control system of the handling system including the control device that the person or the assistant grabs in order to control the system, computer means that converts the movements of the control device and switching means or controller that directly controls e.g. the wheels.

In an aspect of the invention, the direction of said at least one wheel is controllable within a constraint angle such as between nil and 90 degrees in relation to a forward direction of said handling system. Hereby, it is possible to steer the handling system in an advantageous manner with little or no turning radius.

In an aspect of the invention, the angle of direction of said at least one wheel is substantially nil or 90 degrees in relation to a forward direction of said handling system e.g. exactly 0 and 90 degrees, respectively. Hereby, it is possible to convert the handling system from going forward to going sideway with a direct change from nil to 90 degrees.

In an aspect of the invention, the direction of any of said wheels are directly controlled or some of said wheels are directly controlled wheels and some wheels are free directional wheels. Hereby, it is possible to establish a less complicated system in which only some of the wheels need to be directly controlled.

In an aspect of the invention, the movement of said system controls said free directional wheels. Hereby, it is possible to avoid control systems to every wheel of the handling system.

In an aspect of the invention, at least one electric motor is connected to at least one of said wheels. Hereby, it is possible fully to avoid the need for an assistant pushing the handling system, or to use the assistant more in control the direction of the system.

In an aspect of the invention, the system is directionally controlled by at least one controller controlling the direction of said directional controlled wheels and/or at least one controller controls the width horizontally between the right and left base frame parts by pivoting said parts around vertical axles for said parts. Hereby, it is possible to establish a more stable and secure handling system, and especially a system in which the person or his assistant to a high extend may control the direction behaviour and characteristics of the handling system.

In an aspect of the invention, said controller is connected to said directional controlled wheels by rods, electric actuators or similar connection arms. Hereby, it is possible to control the wheels with firm and rigid means ensuring that the wheels are precisely rotated from one position to another.

In an aspect of the invention, said user interface includes control means such as computer means and storage means comprising predefined motor control data or ramps for controlling said at least one electric motor. Hereby, it is possible to provide the handling system with movement and direction characteristics that are adapted to the person or the environment that the handling system is used within.

In an aspect of the invention, said user interface includes communication means. Hereby, it is possible to establish connection with an external data communication centre in order to transmit data to the handling system e.g. data updating the functionality of the user interface. Further, data such as statistic data, person or system-related data may be transmitted to the centre e.g. over an Internet data connection.

In an aspect of the invention, the direction of said at least three wheels being directly or indirectly controllable. Hereby it is possible to direct the handling system in a first direction and subsequently in another direction with no turning radius as the wheel direction is controlled. The direction control may be performed at standstill from a first direction to e.g. a perpendicular direction in which the direction of some wheels are directly controlled and other follows along due to their free movable construction.

In an aspect of the invention, said system comprises at least two free directional wheels and at least one directional controlled wheel e.g. two wheel being directional controlled such as two rear wheels of the system.

The number of directional controlled wheels may in an embodiment be just one surrounded by free directional wheels such as four free directional wheels. However, in a preferred embodiment the number of directional controlled wheels are at least two in order to lower the power that the electric motor shall apply to its corresponding wheel.

It shall be emphasized that the number of electric motors per wheel may be more than (or less than) one but in order to establish an easily controlled and price efficient system one motor to one wheel is preferred.

The invention also relates to a user interface in which said user interface further comprises control means capable of converting the handling of said interface by said person or another person to directly or indirectly control of the direction of each of the wheels of said handling system by pivoting the wheels around a vertical axle for said wheels.

Hereby, it is possible to steer the handling system in an easy and natural way e.g. in limited spaces by the lifted person or an assistant.

In an aspect of the invention, said control device includes at least one joystick or similar control stick. Hereby, it is possible to control the system in a way in which certain handling of the stick is converted to corresponding movements of the handling system.

In an aspect of the invention, one or more buttons converts the control device from a status of substantially forward movement to a sideway movement. Hereby, it is possible to navigate the system in narrow spaces in an optimal manner e.g. without turning radius when shifting driving direction.

In an aspect of the invention, said control means includes computer means and storage means comprising predefined motor control data or ramps. Hereby, it is possible to control the handling system in an advantageous manner that e.g. is gentler for the person being handled.

In an aspect of the invention, said control means includes communication means e.g. for communicating system or person data. Hereby, it is possible to establish connection with an external data communication centre in order to transmit data to the handling system e.g. data updating the functionality of the user interface. Further, data such as statistic data, person or system-related data may be transmitted to the centre e.g. over an Internet data connection.

Further, the invention relates to a method of handling a person, such as lifting or moving the person from a first position to another, with a handling system including at least one user interface, said method comprises the following steps: lifting the person by a lifting device of said handling system, moving the person in said handling system, directly or indirectly controlling the direction of each of the wheels of said handling system by said at least one user interface, in which the control is performed by the person being handled or an assistant. Hereby is an advantageous embodiment of the invention achieved.

THE FIGURES

Figure 2:
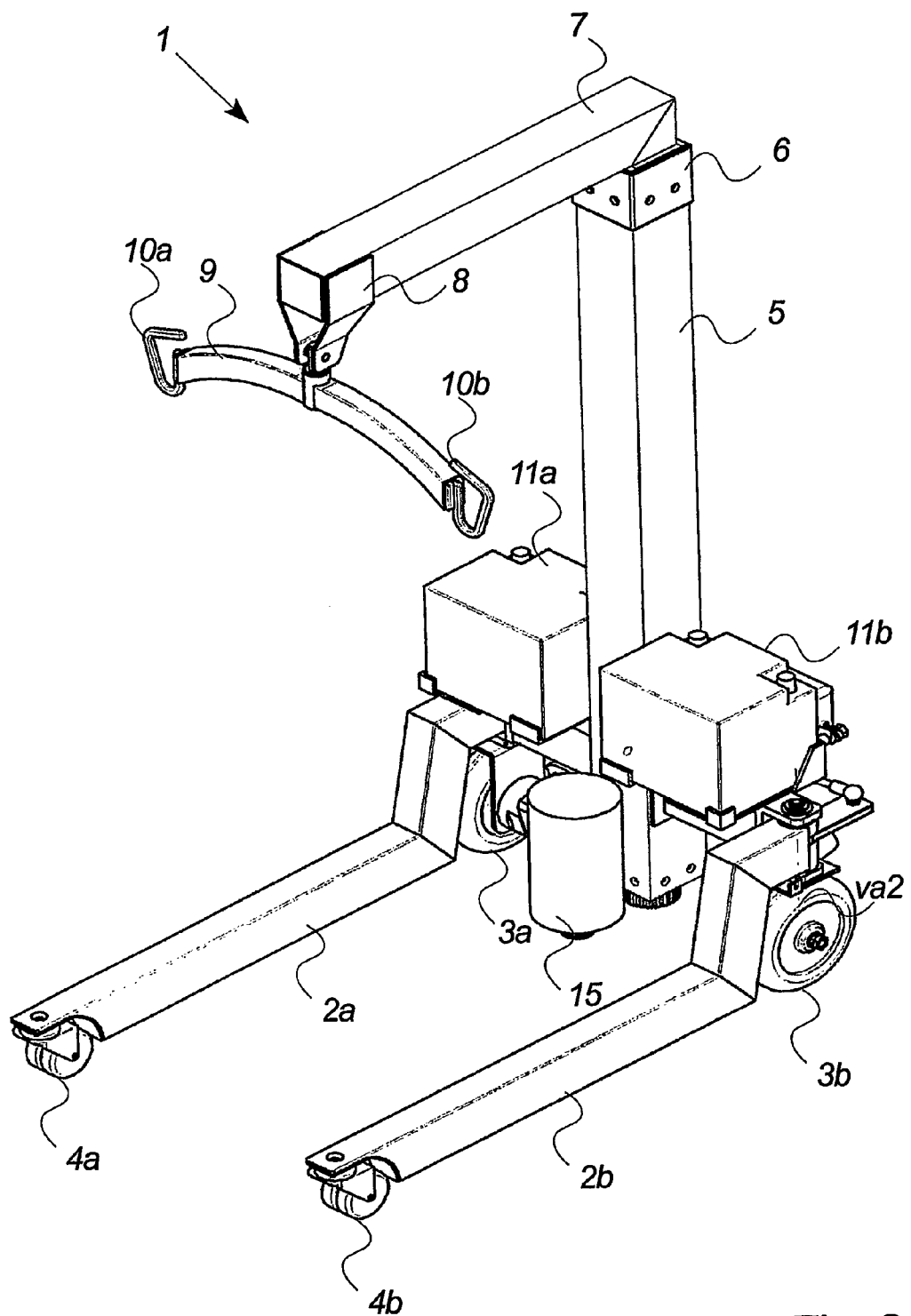
Figure 3:
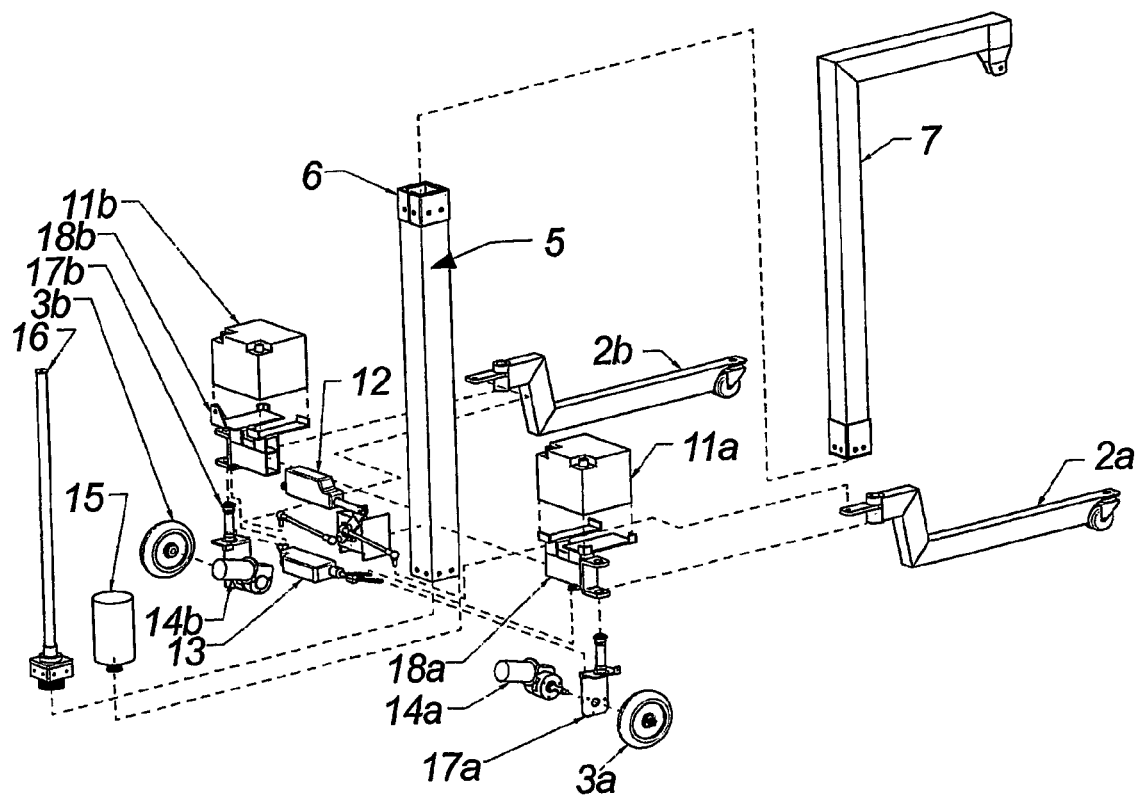
Figure 4:
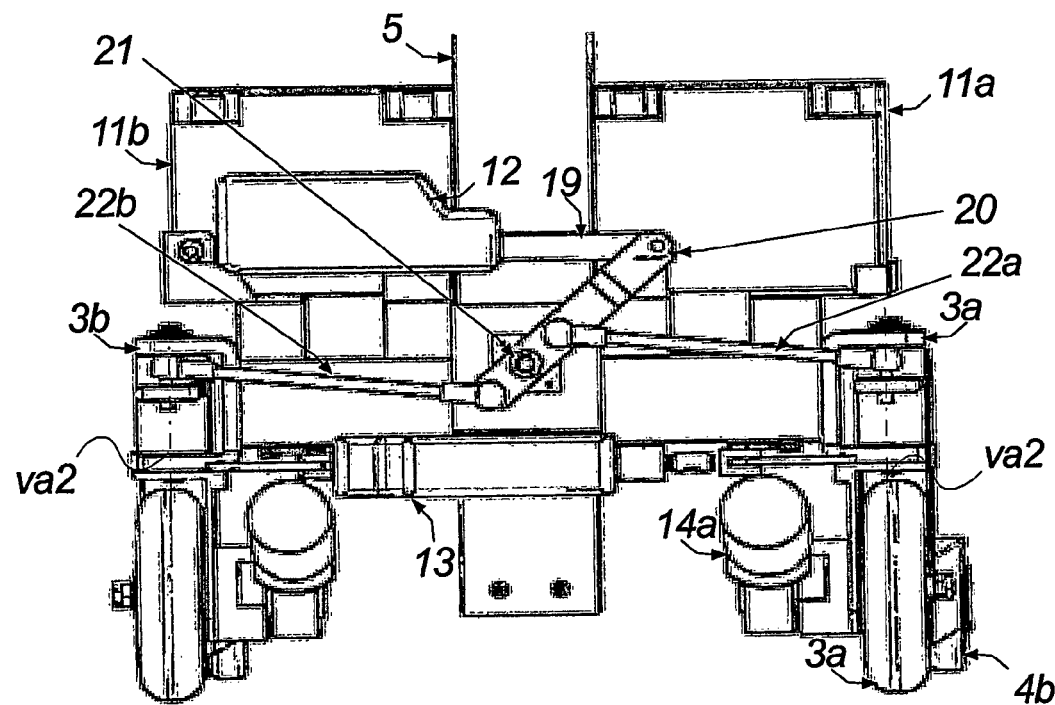
Figure 5:
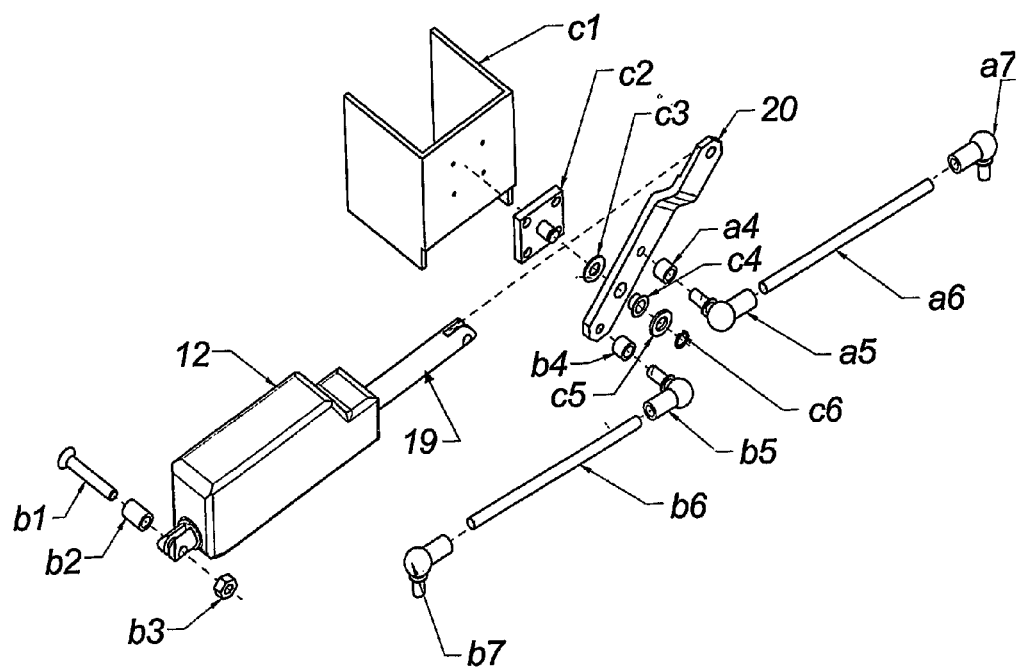
Figure 6:
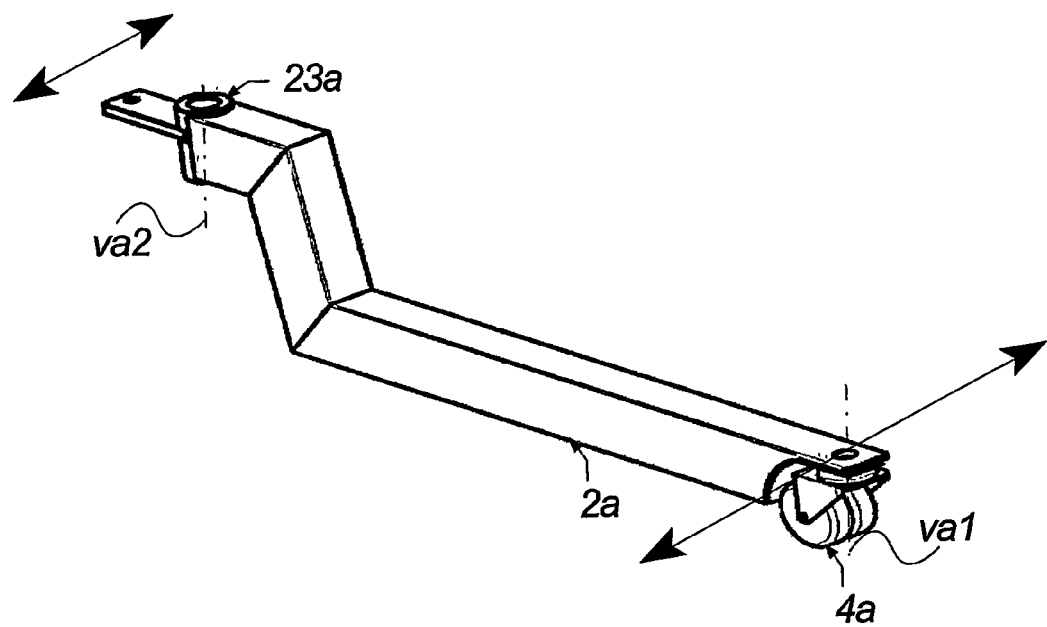
Figure 7A:
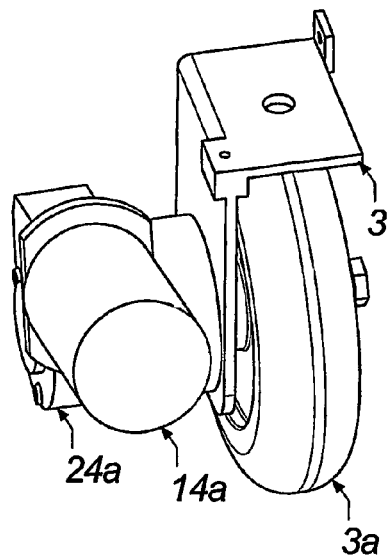
Figure 7B:
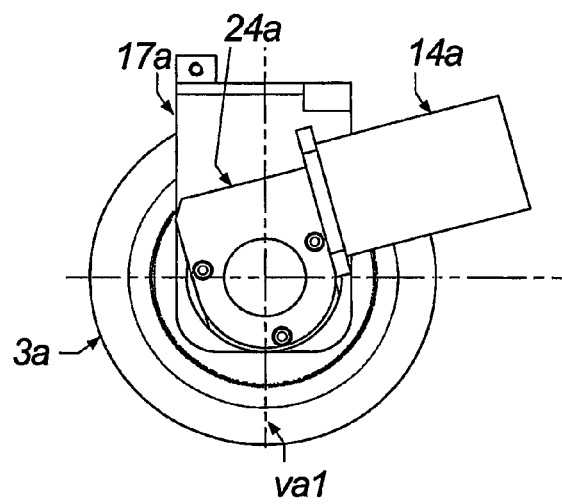
Figure 7C:
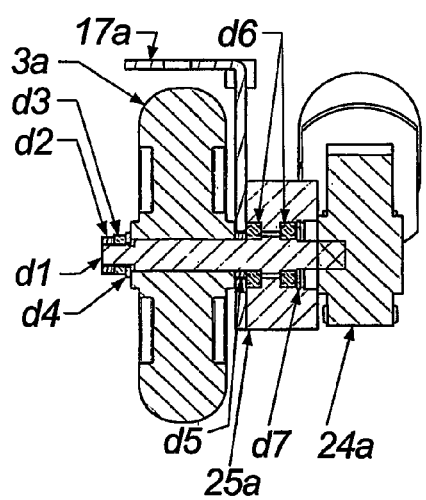
Figure 8:
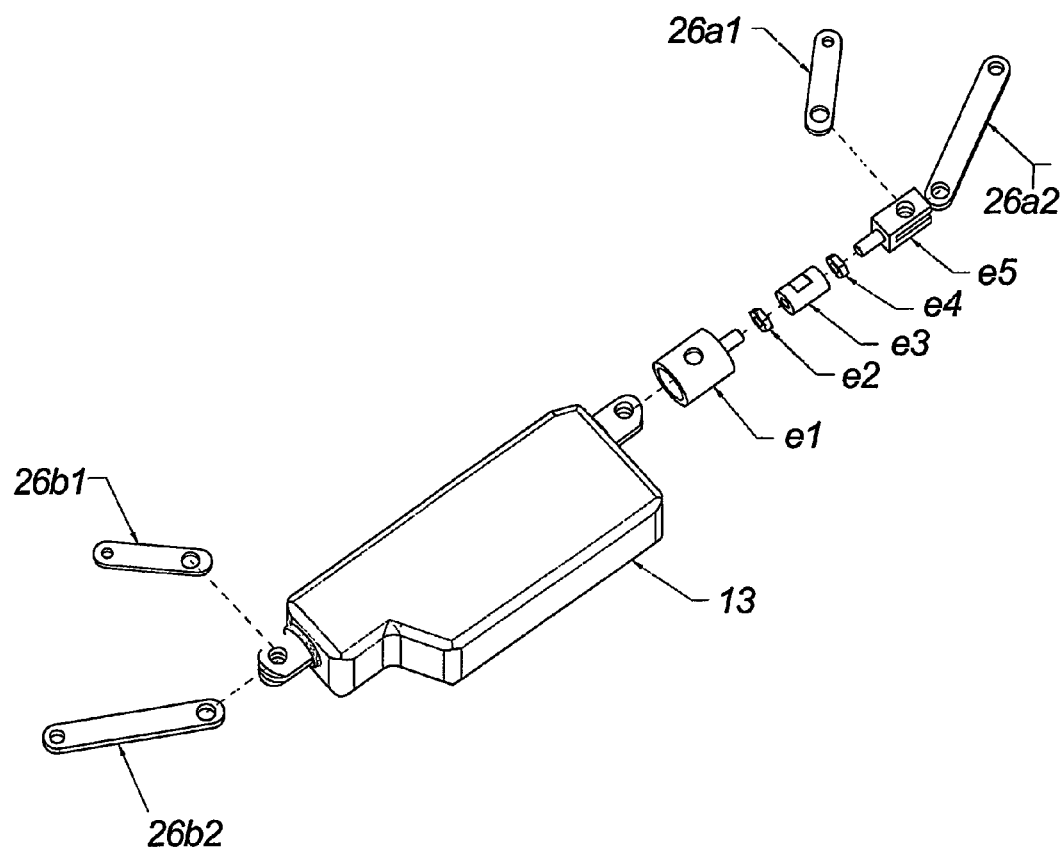
Figure 9A:
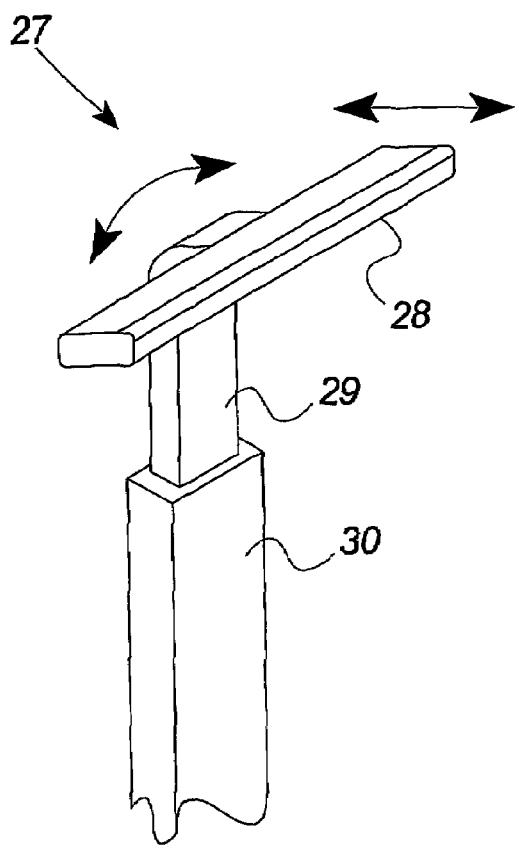
Figure 9B:
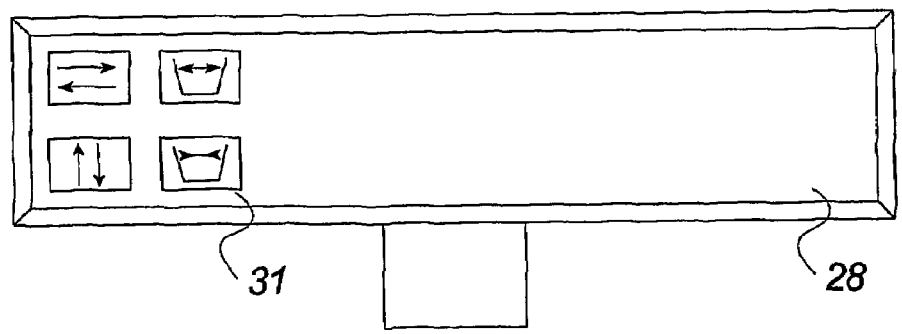
Figure 10:
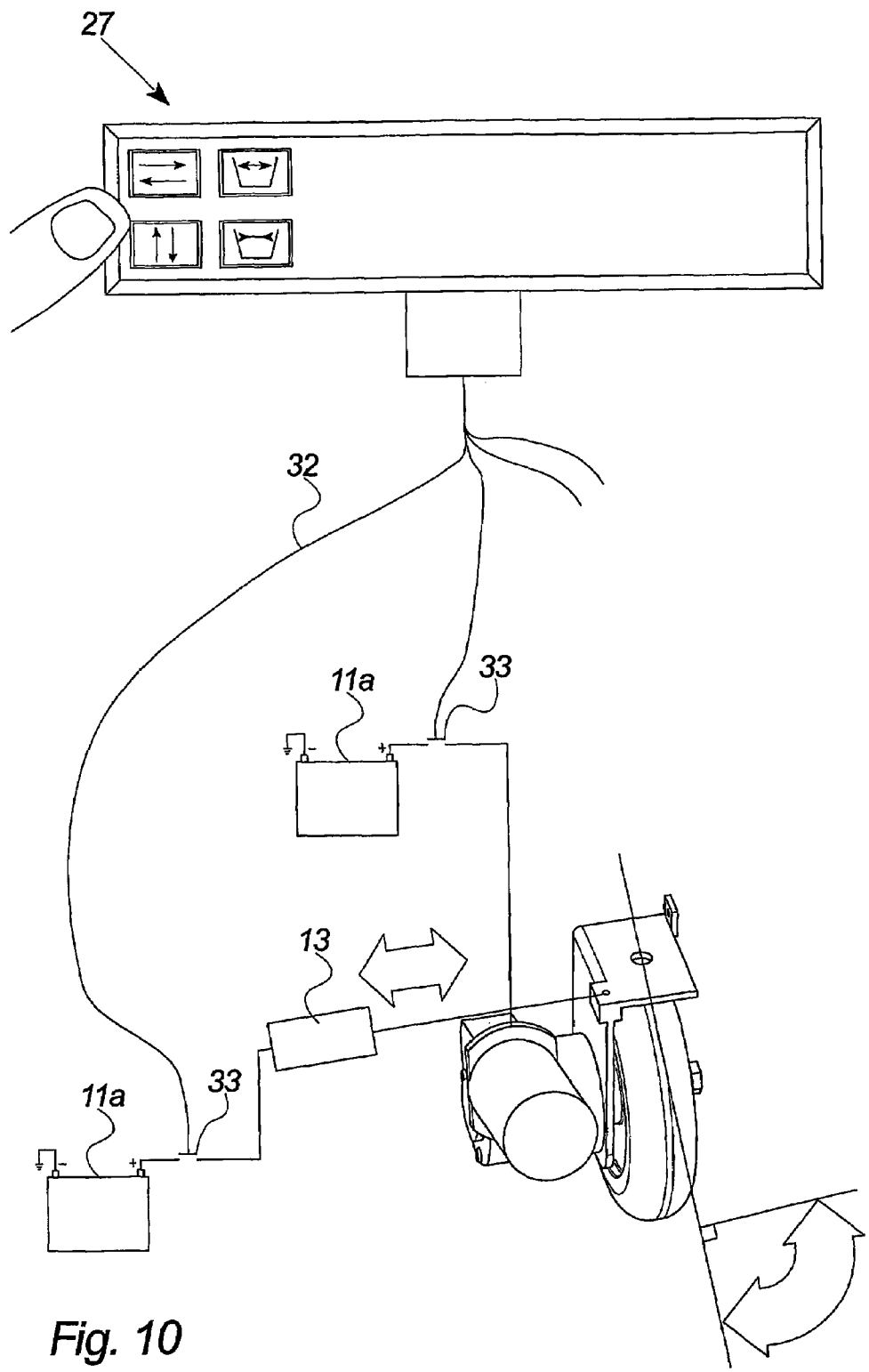
Figure 11:
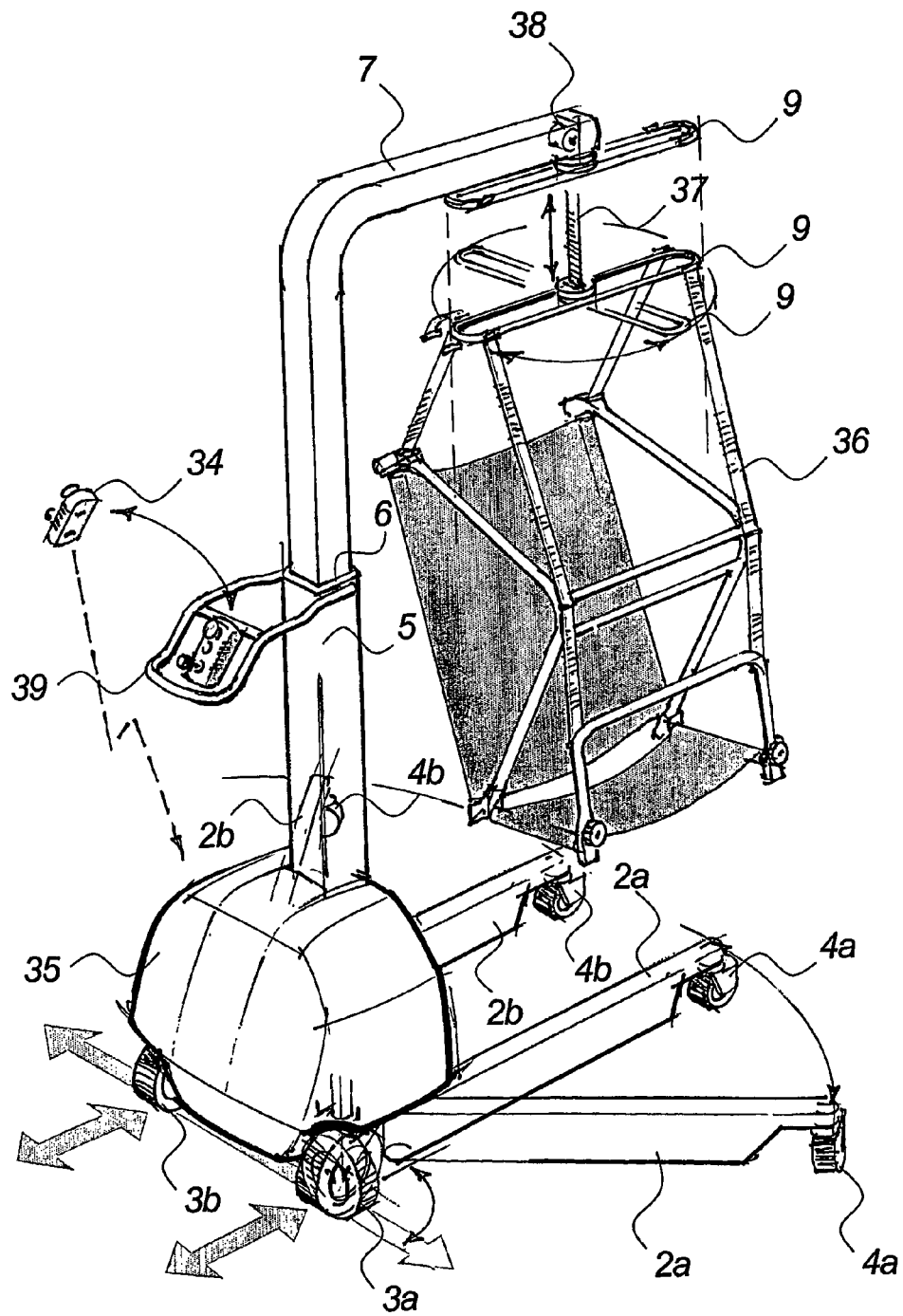

The invention will be described in the following with reference to the figures, in which FIG. 1 illustrates a handling system according to the invention seen from the rear, FIG. 2 illustrates the handling system seen from the front, FIG. 3 illustrates an exploded view of the handling system, FIG. 4 illustrates a sectional view of handling system seen from the rear, FIG. 5 illustrates an exploded view of a preferred embodiment of the width controller, FIG. 6 illustrates the width control including a base frame part, FIG. 7a to 7c illustrate different views of a directional controlled wheel, FIG. 8 illustrates an exploded view of a wheel controller, FIG. 9 illustrates a preferred embodiment of a user interface, FIG. 10 illustrates schematically the connection between the user interface and the directional controlled wheel, and FIG. 11 illustrates a further embodiment of the handling system according to the invention.

DETAILED DESCRIPTION

FIG. 1 illustrates a handling system 1 for a (permanently or temporarily) disabled person such as a bedridden person that needs lifting and movement to a second position e.g. a chair and vice versa. The handling system of the figure is seen from the rear and substantially in a forward moving direction of the system.

The handling system 1 comprises a left and right base frame part 2a, 2b pivotally connected in one end to a left and right centre arm 18a, 18b. The pivoting movement of each base frame part is established around a vertical axle va2. The frame parts and the centre arms together form the horizontal part of a base frame and are shaped as a fork in which each part extends from one end of a centre arm. The other end of the centre arms is connected to opposite sides of a vertical base frame 5 at a lower position of the frame. The connection between the vertical base frame and the centre arms are preferably achieved by welding the parts together in order to establish a sufficiently rigid connection. The vertical base frame 5 is a hollow square tube which upwards ends in a furnishing reinforcing an opening 6 for a lifting frame 7.

The vertical base frame, the centre arms and the base frame parts together define the base of the handling system from which the lifting frame 7 and a lift yoke 9 is elevated as a lifting device for a person.

The vertical part of the lifting frame extends from the opening of the vertical base frame and may be lifted up or down by drive means as will be explained in connection with FIG. 3. The lifting frame also comprises a horizontal frame part continuing from the top of the vertical part and ending in a furnishing that forms a flexible and pivotal lifting point 8 for the lifting yoke 9. At opposite ends of the yoke is positioned lifting hooks 10a, 10b that allow the suspension of a lift such as a standard sling for a disabled person or an "instructor lift" created as described in Danish Pat. App. No. PA 2003 00030 and International Patent App. No. PCT/DK04/000015 "Method of handling a person . . . " to Asger Gramkow, the disclosures of which is herein incorporated by reference. An embodiment of the lift is illustrated in FIG. 11.

The lifting frame is a hollow square tube with outer dimension allowing it to freely slide inside the vertical base frame.

Besides being foundation for the lifting frame 7 the base frame also comprises a number of wheels allowing the handling system to be moved over a surface e.g. a floor. The front wheels 4a, 4b are each positioned below one front end of the base frame parts 2a, 2b. The front wheels are connected to the base frame parts with a single vertical axle (illustrated schematically with va1) allowing the wheels to move freely horizontally in a given direction depending on the direction of the force they experience. The wheels are hereafter referred to as "free directional wheels".

At the opposite end of the base frame parts are positioned two wheels 3a, 3b. Each wheel is connected to the corresponding base frame part with a vertical axle expanding through an opening in the part at the connection point of the centre arms (illustrated in FIGS. 3 and 6). The axle allows the wheel and the base parts to turn around the axle (illustrated schematically with va1) in a given direction in relation to the centre arms. However, the direction of the wheel is controlled by a wheel controller 13 connected to each of the wheels 3a, 3b through connection arms (as will be explained further in connection with FIG. 5).

The wheels being directional controlled are hereafter referred to as "directional controlled wheels".

In order to be able to change the width between the base frame parts 2a, 2b at their front ends, comprising the free directional wheels, the base parts are connected to a controller 12 of the width. The connection to the controller is made at the opposite end of the base frame parts just behind the opening of the base frame parts in which the frame base parts may turn. The width controlling will be further explained in connection with FIGS. 4 and 5.

The directional controlled wheels 4a, 4b are each connected to an electric motor 14a, 14b. The motors transfer force to the wheels and thus forcing them to turn forward or backwards at an individually controllable speed. The electric energy to the motors is supplied by two electric accumulators 11a, 11b positioned on opposite side of the vertical base frame on holder furnishings at the top of the centre arm 18a, 18b.

The accumulators also supply energy to the rest of the handling system including the lifting device, the user interface for the handling system including controllers as well as any security systems and sensors needed in connection with the lifting and moving of a person in the handling system.

FIG. 2 illustrates the handling system seen from the front.

In front of the vertical base frame 5 and beneath the accumulators is positioned a spindle motor 15 with a connection to a spindle (not illustrated in the figure) e.g. a toothed gearing, a belt or a chain connection. The spindle is positioned inside the vertical base frame 5 and the vertical part of the lifting frame 7. The spindle allows the vertical part of the lifting frame 7 to be lowered or lifted in relation to the base frame.

FIG. 3 illustrates an exploded view of the handling system in which the connections between the different parts are indicated by dotted lines.

Especially it is seen how the spindle 16 enters the vertical base frame 5 and is secured, at its square base, to the lower end of the frame e.g. with a number of bolts or similar securing means. Subsequently the connection to the spindle motor 15 is established.

Further, the connection and functionality of the centre arms 18, 18b, the base frame parts 2a, 2b and wheel and base frame part furnishing 17a, 17b is clearly seen. Especially, the pivotally connection of the furnishing and the frame part in relation to the centre arm is understandable with a vertical axle of one wheel furnishing going through vertical openings in one frame part and centre arm. Above the opening of the centre arm the axle is secured in such a manner that it, and thus the directional controlled wheel pivot in a horizontal plane, may pivot in relation to the centre arm being fixed to the vertical base frame. Also the frame part may pivot as its only connection to the centre arm is by being positioned between an upper and lower part of the centre arm comprising the opening to the vertical axle of the wheel furnishing. When the axle enters the opening in the upper and lower part and the opening in the frame part the frame part is only held by the axle allowing it to pivot around the axle in a horizontal plane.

Even further, it is seen how the wheel furnishings 17a, 17b comprise an opening in which axles connect the electric motors 14a, 14b with the directional controlled wheels 3a, 3b. The corresponding sets of wheels and motors are, as illustrated, positioned on opposite sides of their wheel furnishing.

FIG. 4 illustrates a sectional view of handling system seen from the rear. The figure especially illustrates the connection between the controller 12 of the width between the two base frame parts 2a, 2b and especially at the free ends of the base frame parts with the free directional wheels.

The controller 12 is connected with a connection arm 19 to one end of a lever 20. The lever rotates round a centre 21 of rotation when the controller pulls or pushes in the end of the lever. On opposite side of the centre is attached two connection rods 22a, 22b that also comprise connections to the ends of the two base frame parts 2a, 2b and thus establish the vertical axle va2 which the two base frame parts 2a, 2b rotate around.

When the controller pulls or pushes in the end of the lever, the lever turns around the centre and thus pushing one connection rod and pulling the other or vice versa. Hereby, the base frame parts are either pulled together, expanding the distance between them at the opposite "free" end, or pushed apart, narrowing the distance between them at the opposite end.

FIG. 5 illustrates an exploded view of a preferred embodiment of the width controller.

The controller 12 is rigidly connected to the base frame with fastening means b1-b3 such as a bolt, distance pierce and nut, respectively. The horizontally movable connection arm 19 and rods 22a, 22b of the controller 12 are connected to lever as explained above. The lever rotates around the centre 21 of rotation in which the centre includes a furnishing with an axle plate c1, c2 attached to the vertical base frame 5 with a number of bolts. The axle of the plate extends through the opening in the lever 20 with distance pierces c3-c5 and is finally locked with a lock washer c6 allowing the lever rotation around the axle.

The connection rods comprise connection heads b5, b7; a5, a7, respectively allowing a fixed connection to the base frame parts 2a, 2b, the lever and the rods a6, b6 e.g. by using internal and external screw threads.

FIG. 6 illustrates the width control including a base frame part 2a.

The base frame part turns around the vertical opening 23a in the part and especially the wheel furnishing axle that is supposed to extend up through the opening (schematically illustrated with the vertical axle va2). The controller 12, from one side, pulls or pushes at the ending of the base part behind the opening as illustrated with the little double arrow. Hereby is achieved a larger sideway movement of the base frame part at the front end as illustrated with the large double arrow.

With the change of the distance between the front wheels 4a, 4b it is possible to alter different characteristics of the handling system including the sideways stability of the system.

The drive characteristics of the handling system are significantly altered if the free directional wheels are close together compared to far apart. Hereby, the demand on the directionally controlled wheels is also altered.

Further, the stability of the system is altered at different distances, allowing adaptation of the system to different lift and move situations.

Even further, as the front of the handling system often needs to enter restricted areas, e.g. underneath a bed or a chair, the possibility of change is important.

In order to further facilitate the entering of restricted areas the wheels are attached to the base frame parts in such a manner that the free space underneath the parts is minimized. This may be accomplished e.g. by removing the lower part of the square tubes in a section of the base frame part allowing the free directional wheel to be connected to the upper side of the tube. Further the base frame parts are elevated at the back by fixed knee structures above the direction controlled wheels.

FIGS. 7a to 7c illustrate different views of a directional controlled wheel with corresponding wheel furnishing and electric motor, all together forming a directional controlled wheel set.

The wheel set of FIG. 7a is illustrated from a rear viewpoint. The figure shows the electric motor 14a with a gear mechanism 24a allowing the wheel to be positioned perpendicular to the motor and driven at a speed different from the motor speed.

The wheel furnishing 17a is illustrated with a central mounting opening for the vertical axle and a further horizontal opening for the connection arm to the controller 13 of the directional controlled wheel.

FIG. 7b illustrates the wheel set seen from the side and especially illustrating the connection between the electric motor 14a and the gear mechanism 24a.

FIG. 7c illustrates a cross section of the wheel set in which the wheel 3a is divided vertically at its centre. The view illustrates the wheel axle d1 being secured by fastening means d2-d4 such as a nut with distance pierces after having gone through the wheel to the gear mechanism 24a through the wheel furnishing 17a and a baring device 25a with bearings d6 and distance pierces d5, d7. The baring device allows the axle and the wheel to rotate in relation to the furnishing and the rest of the wheel set.

FIG. 8 illustrates an exploded view of a directional controlled wheel controller 13 in form of a linear actuator.

The wheel controller 13 includes a first and second arm extending out of the controller in opposite ends. The arms may transfer force from the controller to the wheel sets and are individually or equally controlled by the controller in response to control signals from a control device of the user interface.

The controller 13 is positioned behind the wheel sets and the vertical base frame in order to make the base frame/wheel sets more compact.

In order to make the connection to the wheel sets the first and second controller arm is fasten to a left and right connection arm 26a2, 26b2, respectively, which make the further connection to the sets e.g. with connection means and distance pierces e1-e5. The connection arms are pointing slightly forward in order to meet the wheel sets positioned ahead of them.

In a preferred embodiment the number of connection arms is increased by two arms 26a1, 26b1 that connect the controller arms to the centre arms. As the centre arms is in an unchanging position the two arms 26a1, 26b1 will pivot around the connection point and thus ensuring that the controller arms are not exposed to deflection when controlling and turning the wheel sets.

In another embodiment the wheel sets are positioned behind or below the vertical base frame allowing the controller 13 to be in line with the wheel sets. The connection from the controller to the wheel sets may thus be straight connection arm.

In a preferred embodiment the polarity of the electric energy supplied to one motor may be inverted, when the wheel sets are in the perpendicular position, in order to ensure that the motors pull in the same direction.

FIGS. 9a and 9b illustrate a preferred embodiment of a user interface to a handling system 1.

FIG. 9a illustrates the user interface comprising a control device 27 such as a joystick or a similar stick e.g. similar to the control stick of an aeroplane. The stick has an outer 30 and an inner connection frame 29 in which the inner connection frame upwardly extends out of the outer connection frame and ends in a horizontal control and holding part 28. The holding part may be grabbed by person and preferably with both hands when controlling the handling system.

The inner connection frame is movable inside the outer connection frame 30 allowing the height of the holding part 28 to be altered and thus adapted to any person using the handling system.

The stick has different functionalities such as controlling the speed, the direction in general or the direction of wheels.

The person may control speed by moving the holding part forward or backward and thus increasing or decreasing the speed of the handling system. If the holding part is held steady in a particular position the handling system continues with the existing speed. When the handling system is brought to a standstill the direction of the system may be changed e.g. from moving forward to moving backward.

The speed may be achieved by increasing or decreasing the electrical energy supplied to the electric motors e.g. the voltage.

If the holding part is turned to either side the handling system will turn to the chosen side. The turn may be accomplished by physically turning the wheels or by supplying the motor differently in terms of electrical energy e.g. slowing one motor and accelerating the another motor and thus forcing the handling system in direction of the slower motor.

The control device of the user interface may be positioned in front of the person, being lifted and moved, and thus allowing the lifted person single-handed to control the handling system. Further, the control device or further parts of the user interface may pivotally, wired or wirelessly be connected to the handling system in such a way that an assistant also may use it e.g. when walking beside or behind the handling system.

In an embodiment of the invention the control device or further parts of the user interface may be part of a remote control carried by the person, being lifted and moved, or an assistant. The communication between the remote control and the rest of the handling system may be established by a high frequency radio link such as an Infrared or Bluetooth link. The remote control may be hand held by the person or the assistant, or strapped to an arm of the person or the assistant. With the latter possibility it may be achieved that the person does not drop the remote control and thus the control of the handling system.

Further, the user interface may collect information from different alarm or warning sensors distributed at the handling system e.g. weight, energy and tilt sensors such as strain gauges. Any alarms or warning signals may be displayed in the user interface e.g. as flashing lights with or without corresponding sound signals indicating the type of alarm or warning and the position of the problem in the handling system.

The sensor may be combined with the controlling means of the handling system e.g. the tilt signal may activate the width controller 12 and thus avoid the handling system from tipping over. The control may also restrict the handling system from continuing of a direction that will endanger the system and the person e.g. stopping the system if sensors indicate that the system is close to tipping over. Further, the control may include automatic returning of the system to the last safe position for the handling system.

The weight sensors may communicate with the control means of the lifting frame and thus only allowing a lift if the weight of the lifted person is less than a security limit. If the weight is close to the limit the control can restrict the functionalities of the system e.g. allowing the system to move but not to lift the person from the present position or allowing the system only to move at lower speeds.

Even further, the computer means of the user interface may collect data from the sensors for statistic purpose e.g. weight that the handling system has carried in a period, the number of accumulator recharging and wheel/motor mileages. The results may be used in planning the next service or replacement of the handling system.

The user interface may also comprise means for recognizing the person using the handling system or the assistant. The recognizing may be achieved by reading a personal card of the person or the assistant such as a card comprising a tag or bar code. With the recognition of the person or the assistant the handling system may automatically be adjusted to the person or the assistant. Further, the system may collect the personal profile of the person or the assistant e.g. stored in storage means of the user interface. The personal profile may include person data such as height, weight and special considerations that shall apply for the person e.g. only low speed of the handling system to avoid unnecessary pain to the person or restricted cruising radius of the handling system in connection with persons having Alzheimer type dementia or the like.

The recognition may also be used in order to determine the persons and assistants that may use the handling system e.g. to avoid unauthorized use of the handling system or to restrict some handling systems to one or more persons/assistants of a larger group and other handling systems to other persons/assistants of the group.

The user interface may also comprise communication means for establishing a connection to a remote location such as a computer centre. The centre can hold general data updates of the handling system that the communication means may download when necessary e.g. new or modified motor control data or ramps. Further, the centre may receive different data from the handling system such as statistic data.

The communication may be transferred over any type of connection such as an Internet data connection established by a mobile telephone device integrated in the handling system.

FIG. 9b illustrates the holding part 28 of the control device and the user interface in more details and especially with a number of buttons 31. The buttons allow the person to alter the control of the handling system.

The first two buttons changes the distance between the base frame parts 2a, 2b e.g. graduated from a maximum distance to a minimum in which one button increases and the other decreases the distance.

The last two buttons directly changes the direction of the directional controlled wheels 3a, 3b e.g. from being parallel with the longitudinal direction of the handling system to perpendicular to the system. The change may be directly from one extremity point to another or graduated from point to point.

The user interface such as the control device 27 may comprise buttons with other functionalities such as buttons lowering the speed range when moving the holding part 28 and thus enhancing the possibility of making accurate movements.

Also it may be possible to switch one or both motors off and release them from the wheels e.g. by a clutch. Hereby, the handling system may easily be pushed manually e.g. in order to save electric energy.

The lifting and lowering of the person in the handling system may too be controlled with buttons on the user interface such as the control device 27.

The functionality of the user interface may remain the same even though the direction of the wheels is perpendicular to the direction of the handling system. By pushing the button the person may thus change the direction from moving forward with the handling system to moving in a perpendicular direction when pushing the holding part 28 forward.

FIG. 10 illustrates schematically the connection between the user interface and the directional controlled wheel.

Wires 32 extend from the control device 27 to different electric control means 33 in the path between the electric accumulators 11a and the directional controlled wheels or the controller 13 for said directional controlled wheels.

The control means 33 may include the necessary switching means in order to control the handling system, such as the direction of the direction controllable wheels and the speed of the electric motors, as well as computer means controlling the switching means along with other means. The computer means may comprise microprocessors, storage means, communication means and so forth required for performing the tasks of the handling system and especially the user interface.

Further, the control means may comprise different predefined motor control data or ramps e.g. stored in the above-mentioned storage means. The control data may control the motors in connection with start and stop e.g. in order to accomplish soft starts or stops or in general to reduce the swings generated in the sling of the handling system.

With the buttons 31 and the position of the control device 27 it is possible to control the different functionalities of the handling system.

FIG. 11 illustrates a further embodiment of the handling system according to the invention.

The figure illustrates how the two rear wheels 3a, 3b may be moved from a first position to a second position in which the movement is performed around a vertical axle. In a preferred embodiment the first and second wheel positions are substantially nil and 90 degrees in relation to a forward direction of said handling system. The wheels are driven by electric motors ensuring that the handling system 1 may perform a forward or a sideway movement as a result of the wheel positions (illustrated with the thick arrows at the wheels 3a, 3b).

The figure further illustrates how the base frame parts 2a, 2b may perform pivotal movements which especially move the free ends of the frame parts (illustrated with the thin arrows at the wheels 4a, 4b). Even further, the figure illustrates how the directions of the wheels follow the movement of the base parts and establish preferred directions by pivoting around the vertical axle.

The frame 35 may enclose electric batteries, electric motors and control means as primarily explained in connection with FIG. 1 to 8.

The figure also illustrates a suspension system 38 comprising a suspension band 37 with one end connected to the centre of the yoke 9. The suspension system is normally integrated in the lifting frame 7 at the lifting point 8. The suspension system further comprises spring means ensuring that the band is rolled in e.g. when the lifting system 36 is unused.

The suspension system is especially used if the person to be lifted is positioned rather low e.g. at the floor. The yoke with the suspension band 37 is pulled down to an advantageous position in relation to the person and the lifting system 36 is established around the person. The suspension band 37 is kept tight at the process because of the spring means and the suspension system and band is locked after positioning the person in the lifting system. The locking mechanism comprises a button (not illustrated) at the side of the lifting frame 7 next to the suspension system. The person is ready to be lifted by the lifting motor 15 when the suspension system has been locked.

If it is necessary the yoke 9 may be pivotally connected to the band and thus allow the person to be rotated e.g. from a sideways position to a position facing the front of the handling system. The rotation may be a free movement that subsequently is locked or a movement in defined steps ensuring that the person is not rotated at undesired times.

In a more advanced embodiment the suspension system may include one or more electric motors driving shafts of the system and thus ensuring that the suspension band is rolled up or down e.g. as a direct part of lifting or lowering the person. The electric motors of the suspension system may also form part of the lifting together with the normal lifting motor.

The length of the suspension band is approximately 1.5 meter in normal embodiments of the handling system.

The handling system has been described above with four wheels including two front wheels, freely directional wheels, and two rear wheels, directional controlled wheels. However, it shall be emphasised that the system may use less wheels, e.g. only one directional controlled wheel together with two freely directional wheels, or more wheels e.g. four freely directional wheels and one or more directional controlled wheels.

Further, the types of wheels may be used in a position may be altered e.g. directional controlled wheels in all positions or only in the front positions.

Even further, the directional controlled wheels may be controlled by a system that includes actuators (as explained above), rack and pinion, toothed cam belts and a gear motor at each wheel or similar systems that may control the direction of the wheels.

In a preferred embodiment of the invention the frame of the handling system is made of aluminium such as extruded aluminium profiles. Steel profiles are also a possibility, but will make the system to bulky, as well as parts in plastic e.g. of a type as PEHD. The plastic may be used e.g. inside the vertical base frame as guiding for the spindle. Further, the spindle nut being positioned and jointed to the interior of the lifting frame may also be made in plastic such as PEHD. Plastic may however not be used in positions experiencing heavy loads.

The aluminium profiles may preferably be anodised before the mounting of the handling system.

The invention claimed is:

1. Handling system for lifting and moving a person from a first position to another, said system comprising
    a frame including a base frame and a lifting frame being part of a lifting device for said person,
    at least three wheels positioned in different parts of said base frame and allowing the handling system to be moved over a surface from said first position to another, each of said wheels are mounted pivotally around a vertical axle of said wheels
    at least one user interface allowing said person or another person to control the handling system,
    at least one of said wheels is directional controllable by a controller from said at least one user interface from a first wheel position to a second wheel position, said controller being wire or wirelessly connected to said at least one user interface,
    wherein the angles of direction of said at least one wheel are pre-defined values and respectively 0 and 90 degrees in relation to a forward direction of said handling system, with a direct change of wheel position from 0 to 90 degrees.

2. Handling system according to claim 1, wherein the angle of direction of said at least one wheel is exactly 0 and 90 degrees, respectively.

3. Handling system according to claim 1, wherein the direction of any of said wheels are directly controlled.

4. Handling system according to claim 1, wherein some of said at least three wheels are directly controlled wheels and some are free directional wheels.

5. Handling system according to claim 4, wherein said free directional wheels are controlled by movement of said system.

6. Handling system according to claim 1, wherein said system comprises at least two free directional wheels and at least one directional controlled wheel.

7. Handling system according to claim 1, wherein the system is directionally controlled by at least one controller controlling the angle of direction of said directional controlled wheels.

8. Handling system according to claim 7, wherein said controller is connected to said directional controlled wheels by rods, electric actuators or similar connection arms.

9. Handling system according to claim 1, wherein at least one controller controls a width horizontally between right and lei parts of the base frame by pivoting said parts around vertical axles for said parts.

10. Handling system according to claim 1, wherein said user interface includes control means comprising as communication means and storage means comprising predefined motor control data or ramps for controlling at least one electric motor.

11. Handling system according to claim 1, wherein said user interface includes communication means for communicating system or person data.

12. Handling system according to claim 1, wherein at least one electric motor is connected to at least one of said wheels.

13. User interface for a handling system according to claim 1 for lifting and/or moving a person from a first position to another,
    said user interface comprises control means capable of converting the handling of said interface by said person or another person to directly or indirectly control of the direction of each of at least three wheels of said handling system by a controller, each of said wheels being mounted pivotally around a vertical axle of said wheels, and said controller being wire or wirelessly connected to said at least one user interface,
    wherein
    said interface controls the angle of direction of each of the wheels with pre-defined values and a direct change of wheel position from 0 to 90 degrees in relation to a forward direction of said handling system by pivoting the wheels around a vertical axle of said wheels.

14. User interface according to claim 13, wherein said user interface further controls power directed to one or more of the wheels in response to the handling by said person or another person.

15. User interface according to claim 13, wherein a control device of said user interface includes at least one joystick or similar control stick.

16. User interface according to claim 15, wherein one or more buttons converts said control device from a status of substantially forward movement to a sideway movement by a direction of approximately 0 degrees or 90 degrees in relation to a forward direction of said handling system.

17. User interface according to claim 13, wherein said control means includes computer means and storage means comprising predefined motor control data or ramps.

18. User interface according to claim 13, wherein said control means includes communication means for communicating system or person data.

19. User interface according to claim 13, wherein said interface controls a controller to control the direction of said directional controlled wheels by pivoting the wheels around a vertical axle for said wheels and a controller to control a width horizontally between right and lei parts of the base frame of said handling system by pivoting said parts around vertical axles of said parts.

20. Method of handling a person by lifting and moving the person from a first position to another, with a handling system including at least one user interface, said method comprising:
providing a frame including a base frame and a lifting frame being part of a lifting device for said person,
providing at least three wheels positioned in different parts of said base frame, each of said wheels are mounted pivotally around a vertical axle of said wheels;
lifting the person by a lifting device of said handling system,
moving the person in said handling system, and
directly or indirectly controlling a direction of wheels of said handling system by said at least one user interface where a direction of at least one wheel is controlled by a controller with a direct change of wheel position between pre-defined values from 0 to 90 degrees in relation to a forward direction of said handling system said controller being wire or wirelessly connected to said at least one user interface,
in which the control is performed by the person being handled or an assistant.

21. Method of handling a person according to claim 20, wherein said movement is achieved by powering one or more of the wheels of the system with one or more electric motors connected to said one or more wheels.

22. Method of handling a person according to claim 21, wherein a direction of said at least one wheel is exactly 0 and 90 degrees, respectively.

23. Method of handling a person according to claim 20, wherein the handling of said interface directly or indirectly controls a direction of each of the wheels of said handling system by pivoting the wheels around a vertical axle of said wheels.

24. Method of handling a person according to claim 21, wherein said handling controls the power directed to one or more of the electric motors connected to said wheels.

25. Method of handling a person according to claim 21, wherein said at least one electric motor controlled by a control device of said user interface including a control stick.

26. Method of handling a person according to claim 21, wherein said at least one electric motor is controlled by said user interface including computer means and storage means comprising predefined motor control data or ramps.

27. Method of handling a person according to claim 20, wherein at least one controller controls the direction of said directional controlled wheels.

28. Method of handling a person according to claim 27, wherein said controller controls said directional controlled wheels by rods, electric actuators or connection arms.

29. Method of handling a person according to claim 20, wherein at least one controller controls a width horizontally between right and left parts of the base frame of said handling system by pivoting said parts around vertical axles of said parts.

* * * * *